United States Patent
Lye et al.

(10) Patent No.: US 8,504,858 B2
(45) Date of Patent: Aug. 6, 2013

(54) WIRELESS INPUT DEVICE WITH A POWER SAVING SYSTEM

(75) Inventors: Keng Yeen Lye, Penang (MY); Lee Ling Teh, Penang (MY); Keng Yearn Chang, Penang (MY)

(73) Assignee: Avago Technologies General IP (Singapore) Pte. Ltd. (SG)

( * ) Notice: Subject to any disclaimer, the term of this patent is extended or adjusted under 35 U.S.C. 154(b) by 273 days.

(21) Appl. No.: 13/019,895

(22) Filed: Feb. 2, 2011

(65) Prior Publication Data

US 2012/0198258 A1 Aug. 2, 2012

(51) Int. Cl.
G06F 1/32 (2006.01)
(52) U.S. Cl.
USPC .............. 713/324; 713/320; 340/156
(58) Field of Classification Search
USPC .............. 713/300–340; 345/156, 163, 165; 340/539.13
See application file for complete search history.

(56) References Cited

U.S. PATENT DOCUMENTS

| | | | |
|---|---|---|---|
| 7,199,783 B2 | 4/2007 | Wenstrand et al. | |
| 7,227,464 B2 | 6/2007 | Afriat | |
| 7,626,576 B2 | 12/2009 | Anandakumar et al. | |
| 7,728,816 B2 | 6/2010 | Xu et al. | |
| 8,207,940 B2 * | 6/2012 | Arrigo et al. | 345/165 |
| 2003/0179183 A1 * | 9/2003 | Lee | 345/163 |
| 2004/0166904 A1 * | 8/2004 | Kuo | 455/574 |
| 2007/0024587 A1 * | 2/2007 | Shiau | 345/166 |
| 2009/0195505 A1 * | 8/2009 | Chen et al. | 345/166 |
| 2010/0066679 A1 * | 3/2010 | Pan | 345/166 |
| 2010/0093279 A1 | 4/2010 | Linsky et al. | |
| 2012/0274564 A1 * | 11/2012 | Cronjaeger et al. | 345/166 |

* cited by examiner

Primary Examiner — Glenn A Auve

(57) ABSTRACT

An input device with a power saving system is provided for reducing the power consumption of the input device when the input device is at rest. The input device may include a sensor, a rest mode switch, control logic and a current controller. The sensor may be configured to obtain an image data in response to a light incident on the sensor. The rest mode switch may be configured to set the input device to various levels of rest modes when it is inactive. The control logic may be coupled to the rest mode switch and the sensor. The control logic may be configured to set the input device to process a portion of the image data on the sensor array during a wake up detection operation when the input device is at rest. The current controller may be coupled to the control logic and the sensor and configured to control the current supply limited to a section of the sensor array containing the portion of image data that is being processed by the input device during the wake up detection operation.

20 Claims, 8 Drawing Sheets

| Operation mode | | | Remarks |
|---|---|---|---|
| SELHFRA | REST | ROW_i | RF | |
| 0 | 0 | ROWQ_i | ROWQ_N | Normal operation-use whole array |
| 0 | 1 | ROWQ_i | ROWQ_N | Normal operation-use whole array |
| 1 | 0 | ROWQ_i | ROWQ_N | Normal operation-use whole array |
| 1 | 1 | 0 | ROWQ_i | Enable half frame wake up detection function |

WIRELESS INPUT DEVICE WITH A POWER SAVING SYSTEM

BACKGROUND

Wireless optical input devices are well known in the art. A typical optical input device uses a light source to illuminate a portion of a navigation surface and a sensor to generate digital images from the light that is reflected off the navigation surface. In general, an optical input device tracks the relative movement between a navigation surface and the input device, multiple frames of digital image data of the illuminated navigation surface are captured by the sensor and successive digital images are subsequently processed and further translated as a cursor movement on the input device.

As the wireless input devices are becoming more popular, power saving has become one of the critical considerations in the design of an energy efficient wireless input device. It is desired to reduce the power consumption of a wireless input device during operation in order to increase the battery life of the device. Additionally, prolonging the battery life may reduce the adverse impact on the environment associated with the disposal of used batteries.

One of the methods that is commonly adopted to improve the energy efficiency of a wireless input device is to put the input device into a rest mode when it is inactive or stays idle for a predetermined period of time. When an input device is in the active mode, the input device operates at full operational capacity. On the other hand, when the device is in a rest mode, portions of the device circuitry are normally rendered inactive, thus, reducing the power consumption. However, in a conventional design, even when the input device is in the rest mode, a wake up detector on the input device may still be in operation, whereby the wake up detector is configured to trigger the input device to periodically check the sensor in order to monitor for movement and immediately wake up the input device if movement is detected. Hence, the input device is periodically being switched to active mode even though it is in an idle state. As a result, much of the supposedly inactivated device circuitry is being activated during the wake up detection operation. Therefore, the input device is actually consuming considerable battery power even though it is in a rest mode while inactive.

In general, during a typical wake up detection operation, the whole image data on the sensor array may be processed by the input device during the motion detection. However, since the computed motion data would not be outputted by the sensor to facilitate any navigation operation during a wake up detection operation. Therefore, an accurate motion data computation is actually not critical and may be unnecessary during the wake up detection operation. Accordingly, there is no need to process the whole image data on the sensor array during waking up detection operation and consuming battery power unnecessarily.

BRIEF DESCRIPTION OF THE DRAWINGS

Throughout the description and figures, similar reference numbers may be used to identify similar elements.

DETAILED DESCRIPTION

Figure 1:
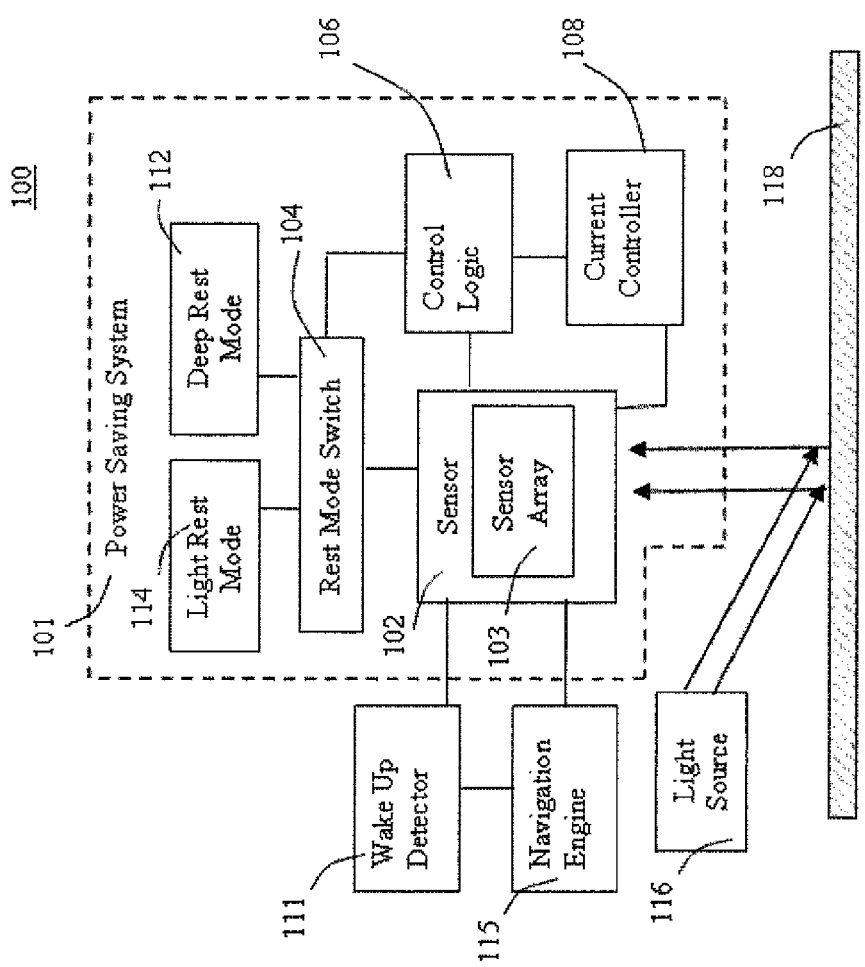
FIG. 1 illustrates a schematic block diagram of an optical input device with a power saving system.

FIG. 1 illustrates a schematic block diagram of a wireless optical input device 100 with a power saving system 101. The input device 100 may include a sensor 102, a rest or sleep mode switch 104, a control logic 106 coupled with the rest mode switch 104, and a current controller 108. Although the illustrated wireless input device 100 is shown and described with certain components and functionality, other embodiments of a wireless input device 100 may have fewer or more components to implement less or more functions. For example, some embodiments of the wireless input device 100 may include a similar power saving system 101 that may be incorporated as part of the micro-controller in a separate chip, rather than being formed as a single chip sensor system for implementing the same.

With reference to FIG. 1, the wireless input device 100 may include a power saving system 101. The power saving system 101 is facilitated by a combination of the control logic 106, the rest mode switch 104 and the current controller 108 operably integrated to reduce the power consumption on the wireless input device 100. In one embodiment, the power saving system 101 may be configured to reduce the power consumption when the input device 100 is at rest or idle for a predetermined period of time. The wireless input device 100 may include a sensor 102 having a sensor array 103 configured to capture image data of a navigation surface 118. A rest mode switch 104 configured to set the input device to various levels of rest modes, such as a light rest mode 114 or a deep rest mode 112 when the wireless input device 100 is inactive. The wireless input device 100 may further comprise control logic 106 coupled to the rest mode switch 104 and current controller 108. The wireless input device 100 may comprise a wake up detector 111 operable configured to periodically check for motion data when the input device 100 is at rest. The wireless input device 100 may further include a light source 116 configured to illuminate the navigation surface 118 and a navigation engine 115 configured to provide a navigation operation.

Generally, when a wireless input device 100 is inactive or at rest, the device may be set to a rest mode after it remains idle for a predetermined period of time. However, when the device is in rest mode, a wake up detection operation may be triggered by a wake up detector 111 to periodically check for any motion on the wireless input device 100. The wake up detector 111 may be configured to immediately switch the input device 100 back to a full run mode or a full navigation mode once a motion has been detected. Generally, in typical wake up detection operation, the whole image data captured on the sensor 102 may be processed by the wireless input device 100 in order to calculate motion data. In other words, the wireless input device 100 may be periodically triggered by the wake up detector 111 to operate almost as if the device is at a full working mode of operation for each wake up detection cycle. However, during a wake up detection operation, any motion data detected would not be output by the sensor 102 to facilitate any navigation operation. Therefore, an accurate motion data calculation is actually not critical for the wake up detection operation. Thus, during the wake up detection operation, it may be unnecessary to process the image data from the entire sensor array 103 for the motion calculation when the input device 100 is in the rest mode of operation. Accordingly, it may not be necessary to process the image data from the entire sensor array 103 just for the purpose of wake up detection, which may consume more battery power than necessary.

In one embodiment as shown in FIG. 1, the wireless input device 100 may include a power saving system 101 that comprises a sensor 102, control logic 106, a rest mode switch 104 and a current controller 108. The sensor 102 may include a sensor array 103 configured to receive light reflected from the navigation surface 118. The sensor array 103 may include a plurality of photo sensitive elements (not shown) configured to receive light reflected from the navigation surface 118 and subsequently generate a signal in response to the respective light received. The size of the sensor array 103 may be dependent on the type of application and the performance requirements of the device. For example, a wireless input device 100 with an image sensor 102 having a high quality navigation performance may require a 20×20 array or a 30×30 array of photosensitive pixel elements 103.

In one embodiment, the rest mode switch 104 may include logic circuitry having a timer, operable to set the wireless input device 100 into various levels of rest modes corresponding to the duration that the wireless input device 100 has been at rest. For example, when the input device 100 is at rest for a predetermined period of time, the rest mode switch 104 may be triggered to switch the input device 100 to a certain level of rest mode based upon the duration of the inactivity. In one embodiment, the rest mode switch 104 is operable to set the wireless input device 100 to a light rest mode 114 when the input device is at rest at an initial stage and next to a deep rest mode 112 as the input device 100 remains at rest after a subsequent interval of time. The rest mode switch 104 may be configured to put the wireless input device 100 into a different level of rest modes, for example, when the input device is at rest for the first few seconds, the wireless input device 100 may be switched to light rest mode 114, but if it still remains inactive continually for a subsequent interval of time, the input device may be switched to a deep rest mode 112 as a result. However, the length of the inactivity period may vary depending on the application environment. In addition, the duration of inactivity and the various degrees of rest modes may vary and also may be programmable by the user depending on the application.

The wireless input device 100 may include control logic 106 coupled to the rest mode switch 104 and the sensor 102. In one embodiment, the control logic 106 may be configured to set the wireless input device 100 to process a portion of the image data on the sensor array 103 during a wake up detection operation when the wireless input device 100 is at rest. Wherein the control logic 106 may be configured to dynamically set the wireless input device 100 to process a predetermined portion of the image data on the sensor array 103 during the wake up detection operation when the wireless input device 100 is set to the light rest mode 114 and subsequently process a substantially smaller portion of image data relative to the predetermined portion of the image data when the wireless input device 100 is set to the deep rest mode 112 next. Consequently, when the input device 100 is in a deep rest mode 112, rather than periodically processing the entire image data during the wake up detection operational cycle, the control logic 106 may instead trigger the wireless input device 100 to process only a smallest possible portion of the image data for monitoring movement on the wireless input device 100 during the wake up detection operation. In one embodiment, the control logic is configured to set the wireless input device to process a substantially smaller portion of image data relative to the predetermined portion of the image data when the input device is subsequently set to the deep rest mode. Hence, the wireless input device 100 may be configured to consume less battery power when it is at rest in a deep rest mode 112.

Figure 2:
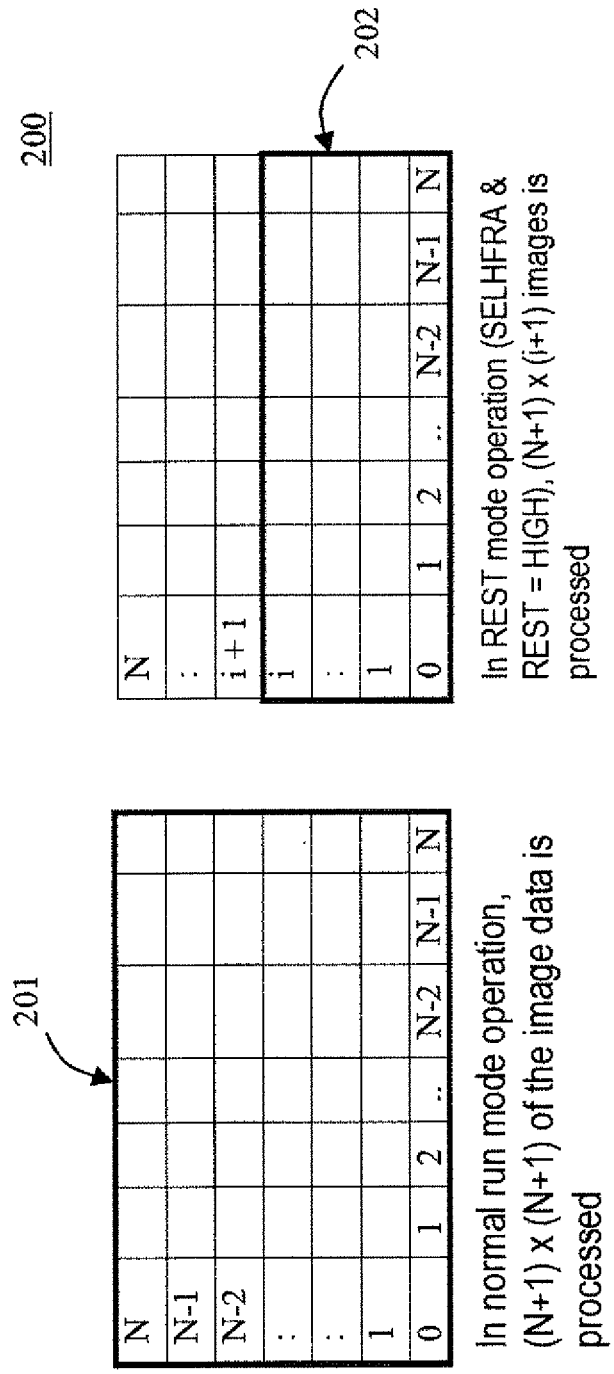
FIG. 2 illustrates a sensor array in a full frame run mode operation and in a half frame rest mode of operation.

FIG. 2 illustrates a sensor array 200 under a normal run mode operation and a rest mode operation. Although the rest mode switch 104 may be operable to set the wireless input device 100 into various levels of rest modes, corresponding to the duration of when the wireless input device 100 has been at rest. However, for simplicity and for the purpose of easy understanding, the wireless input device 100 as illustrated in FIG. 2 and onwards will be set to either: (i) operate under a normal run mode whereby the full frame image data of the sensor array 103 may be processed when the wireless input device 100 is active or (ii) operate under a rest mode whereby only half frame image data of the sensor array 103 may be processed when the wireless input device 100 is at rest. In the example shown in FIG. 2, when the input device 100 is under normal run mode operation, the image on the whole sensor array 201, represented by the equation $((N+1)\times(N+1)$ as shown in FIG. 2), may be processed and output to a digital core of the sensor 102. However, when the wireless input device 100 is in rest mode, for example, when only half of the sensor array 202 may be activated, the control logic 106 may send a signal to the sensor 102 and trigger the sensor 102 to output only half of the sensor array 202. Therefore, the image of half of the sensor array 202, represented by the equation $[(N+1)\times(i+1)]$ may be processed and output to a digital core of the sensor 102. Thus, when the wireless input device 100 is at rest, the digital core will be doing the normal wake up detection, but the wireless input device 100 may be configured to process only half of the image data on the sensor array 200 under such circumstances.

In one embodiment, when a motion interrupt has been reported by the wake up detector 111, the wireless input device 100 may be triggered to use the entire sensor array 103 to output the motion data for an actual navigation operation. In this exemplary embodiment, the power saving on the wireless input device 100 may be accomplished under two conditions. First, power savings may be achieved by utilizing a shorter signal processing time for both analog and digital core during the wake up detection routine. And second, a power savings may be achieved if only a portion of sensor array 200 is activated when the wireless input device 100 is in rest mode.

Figure 3:
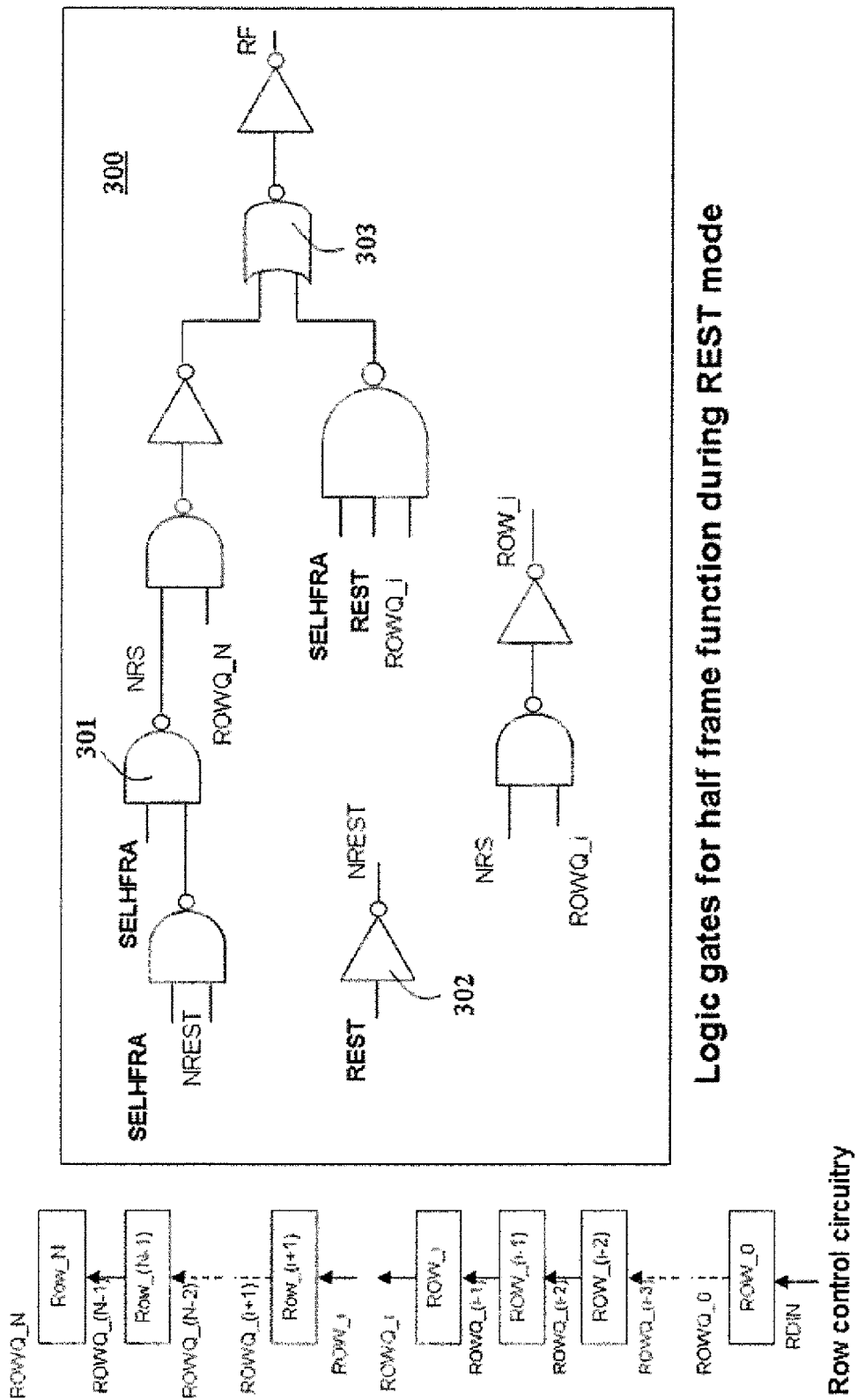
FIG. 3 illustrates control logic circuitry configured to enable power savings using a half frame function during a rest mode of operation.
Figures 4, 5:
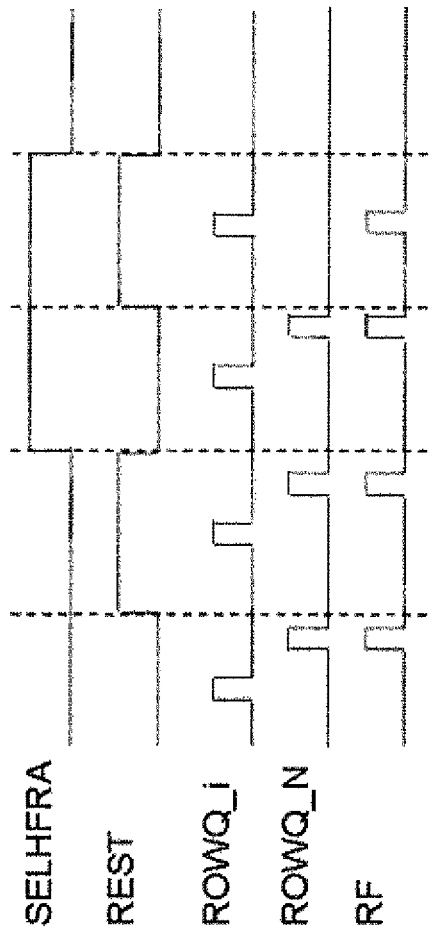
FIG. 4 illustrates a truth table showing full frame run mode and half frame wake up detection mode control signals.
FIG. 5 illustrates a wave diagram representing a half frame wake up detection control signals.

FIG. 3 illustrates an example of control logic circuitry 300 for enabling power savings by means of half frame function during rest mode. FIG. 4 illustrates a truth table representing half frame wake up detection control signals. And FIG. 5 illustrates a wave diagram representing half frame wake up detection control signals. In general, FIGS. 3-5 illustrate various aspects of the power saving system 101, which may be implemented on a wireless input device 100 for power savings. For simplicity, it is assumed that the input device 100 is in a rest mode, whereby the control logic is configured to set the wireless input device 100 to process only half the image data on the sensor array 103 or to perform a half frame function at that point in time.

As shown in FIG. 3, control logic circuitry 300 may be integrated as part of a power saving system 101 for saving power by implementing a wake up detection operation only on half of the sensor array 103. For example, the power saving system 101 may include control logic circuitry 300, which comprises a plurality of logic gates (for example, NAND 301, NOT 302 and NOR 303 gates) and control signals, such as "SELHFRA" (select half frame or select certain rows), "REST" (sensor in rest mode) and ROWQ_i (row feedback of row i) signals. Wherein "i" is the number of row image for processing. The ROW_"i" is the signal used to continue the row image processing for a subsequent row. ROWQ_N is the row feedback of row N. The logic gates "SELHFRA" (select half frame) and "REST" control signals may be added in the array core of the sensor 102 for manipulating the row feedback signal or RF signal. The RF is the signal used to trigger the digital core upon the completion of processing of "all" row images, whereas RDIN represents an active high pulse to initiate a row image processing. RF and ROW_i signal could be simplified and represented with the formula:

$$RF = [\overline{[(REST \cdot SELHFRA) + \overline{SELHFRA}] \cdot ROWQ\_N}] + \overline{SELHFRA \cdot REST \cdot ROWQ\_i}$$

$$ROW\_i = [\overline{(REST \cdot SELHFRA) + \overline{SELHFRA}}] \cdot ROWQ\_i$$

Referring now to FIG. 4 and FIG. 5, in one example when the input device 100 is in a rest mode, the control logic 106 may be configured to trigger the wake up detector 111 to operate under a half frame wake up detection function. At this point, both "SELHFRA" and "REST" may be set to HIGH. Hence the shift register of the row control circuitry would stop at row #(i+1) (via signal ROW_i). Subsequently, the RF would be triggered upon the completion of processing for row #i, (via signal ROWQ_i). Therefore, only half of the image data or half frame may be processed during the wake up detection operation. Hence the time, as well as the power spent in signal processing may be reduced, in contrast to a normal operation mode, whereby the RF signal will be triggered upon completion of the last row #N.

Figure 6A:
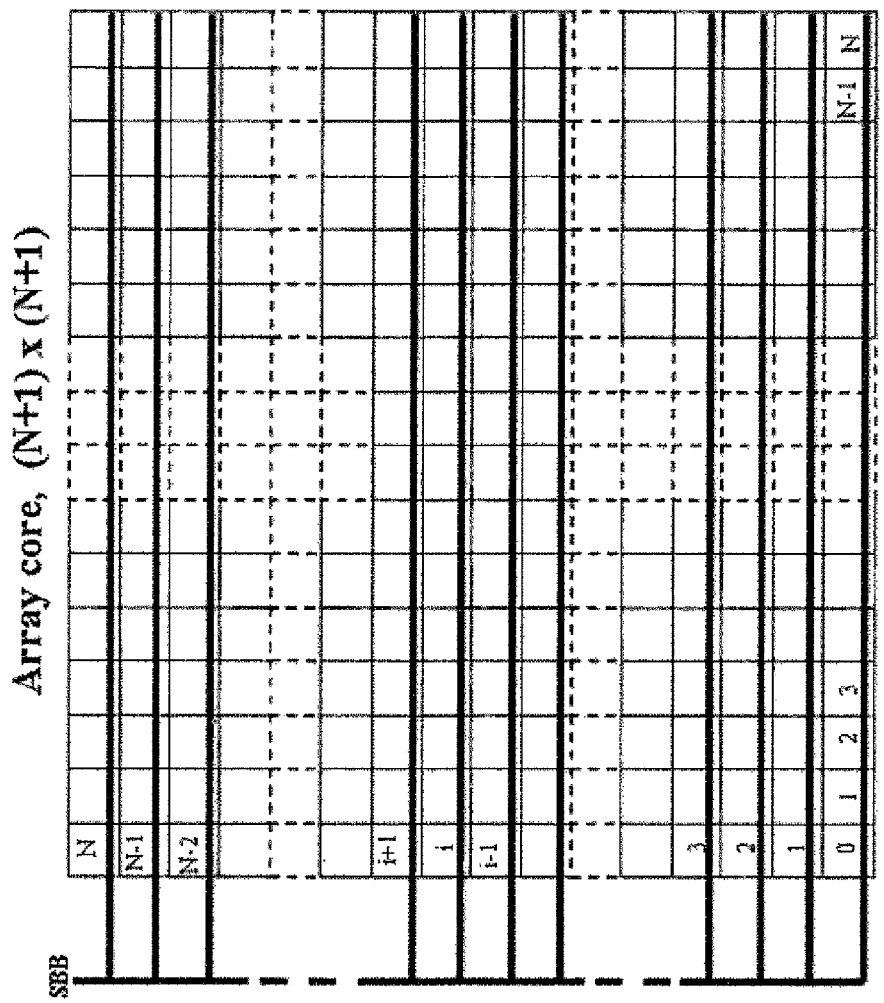
FIG. 6A illustrates biasing of a sensor array core in a normal run mode of operation.
Figure 6A:
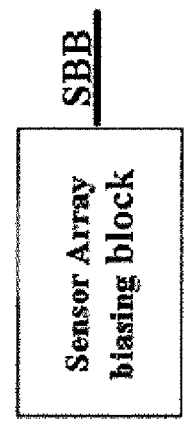

In one embodiment, the input device 100 may also include a current controller 108 coupled to the control logic 106 and operable to enable the input device 100 to consume less battery power when it is at rest. The current controller 108 may be configured to limit the current supply to a section of the sensor array 102 containing the portion of image data that is being processed by the wireless input device 100 during the wake up detection operation, as described previously. FIG. 6A illustrates the biasing of the sensor array core in a normal run mode, whereby the biasing voltage is supplied to the whole sensor array, such that the entire sensor array (N+1)× (N+1) is enabled. The sensor array biasing block (SBB) may be a voltage biasing node from the sensor array biasing block.

Figure 6B:
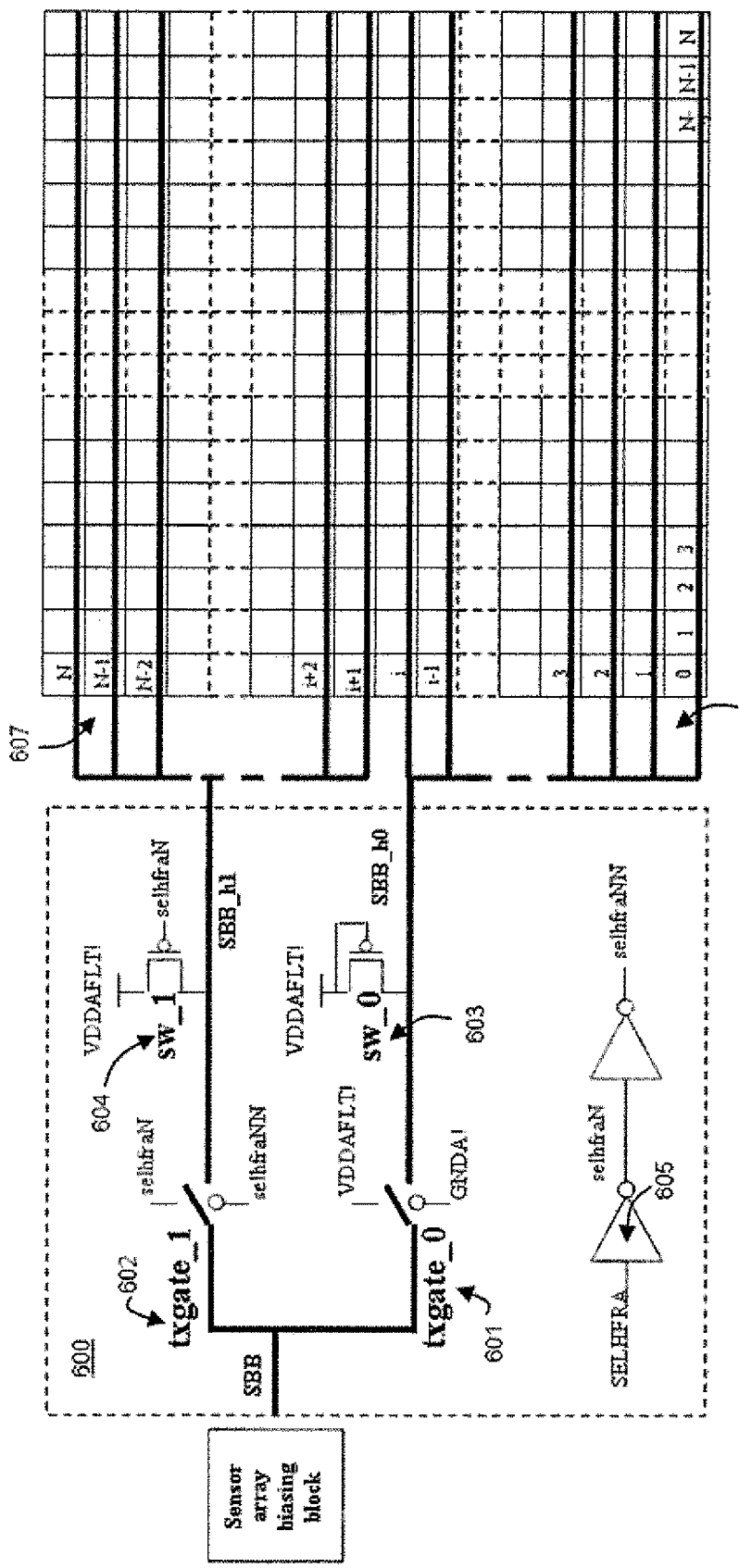
FIG. 6B illustrates current controller circuitry configured to enable power savings during a half frame wake up detection mode of operation.
Figure 7:
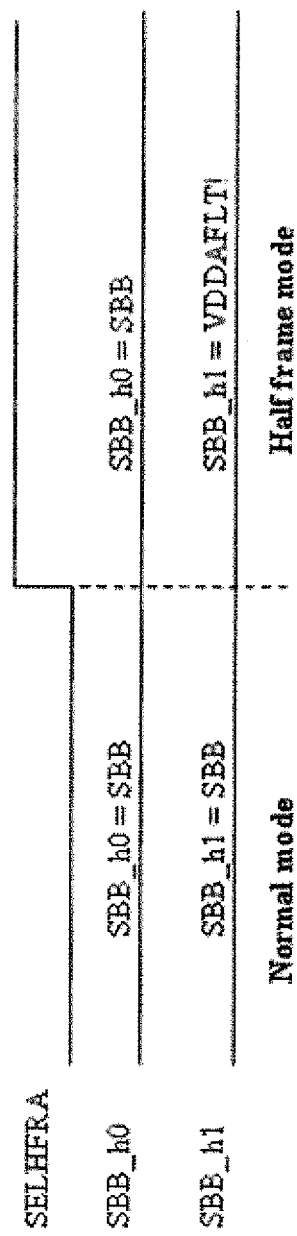
FIG. 7 illustrates a waveform of voltage biasing of a sensor array during a normal mode of operation and a half frame mode of operation by a current controller.

In one embodiment, for enabling power savings when the wireless input device 100 is at rest, a sensor array biasing block may be configured to bias current to the sensor array 103 restricted to only the active half frame or certain rows (i.e. ROW_0 to ROW_i) of the sensor array 103, instead of the entire array as in normal run mode, as shown in FIG. 6A. FIG. 6B illustrates current controller circuitry 600 for enabling power savings during a half frame wake up detection operation, while FIG. 7 illustrates a waveform of voltage biasing of a sensor array during a normal run mode and a half frame mode by current controller circuitry 600. Both FIG. 6B and FIG. 7 are representing the scenario in which the input device 100 is at rest at a predetermined level of rest mode, whereby the current controller 108 may be configured to bias the current supply to only the active portion of the sensor array 103 from which the image data are being processed. As shown in FIG. 6B, in order to limit the sensor array biasing current, the current controller circuitry 600 may include two transmission gates txgate_0 601 and txgate_1 602, PMOS switches sw_0 603 and sw_1 604, and inverters 605. The transmission gates and switches are controlled directly by the SELHFRA signal, because the current controller 600 is being coupled with the control logic 106. Therefore, when the input device 100 is under a normal run mode, the whole sensor array 103 may be biased by SBB via SBB_h0 and SBB_h1. However, when the input device 100 is at rest at a predetermined level of rest mode; for example, when the current controller 600 is configured to enable only a half frame during a wake up detection operation, the biasing voltage for sensor arrays 103 in the "inactive" half frame 607 (i.e. ROW_(i+1) to ROW_N) will be cutoff by pulling SBB_h1 to supply rail (VDDAFLT!). Hence, only the "active" half frame 606 (i.e. ROW_0 to ROW_i) remains biased by SBB node via SBB_h0. Therefore, when the input device 100 is at rest, only half of the sensor array 103 may be activated during the wake detection operation, thus enabling the input device to consume less power when it is at rest.

Figure 8:
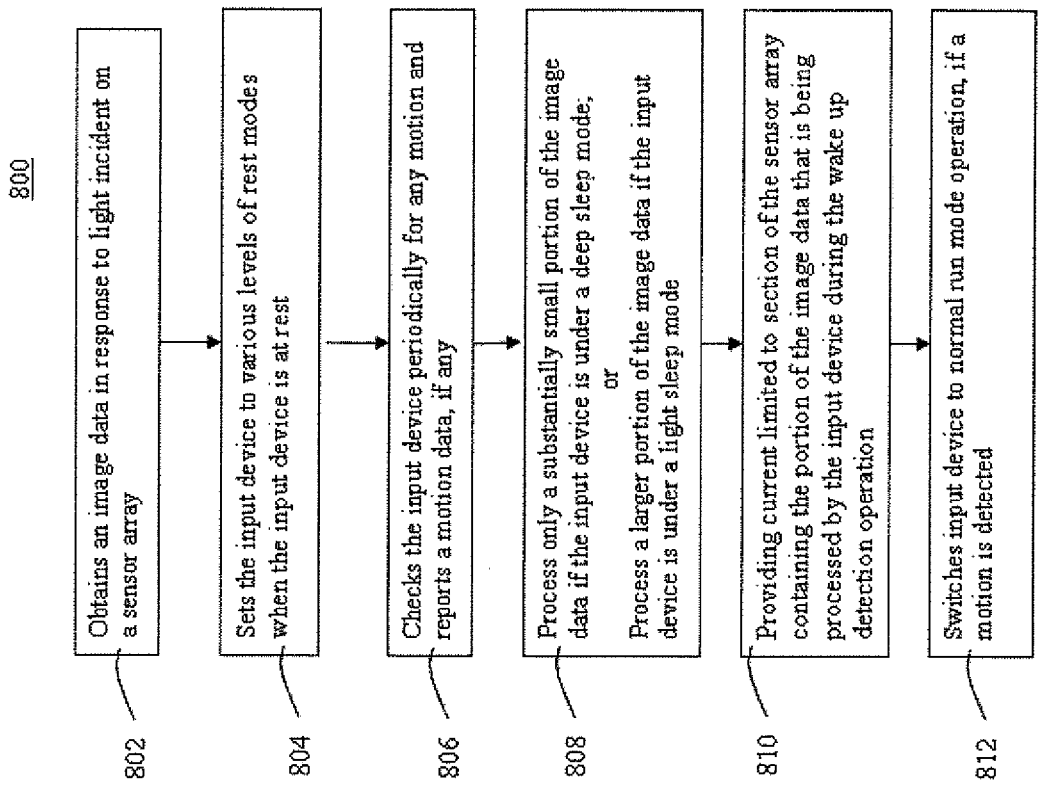
FIG. 8 illustrates a flow chart of a power saving method for a wireless input device.

FIG. 8 illustrates a flow chart of an embodiment of a power savings method 800 for use in a wireless input device 100. At block 802, the wireless input device 100 obtains image data in response to light incident on a sensor array 103. When the input device 100 is in active mode or in rest mode, at block 804, the rest mode switch 104 sets the input device to various levels of rest modes, depending on the period of inactivity. For example, the rest mode switch 104 is configured to set the wireless input device 100 to a light rest mode 114, when the input device is at rest at an initial stage and to a deep rest mode 112, as the input device 100 remains at rest after a subsequent predetermined interval of time. The rest mode switch 104 may be configured to set the wireless input device 100 into different levels of rest modes, for example, when no motion has been detected for a first few seconds, the wireless input device 100 may be switched to light rest mode 114, and if it remains inactive continually for a subsequent predetermined interval, it may be further switched to a deep rest mode 112. While the input device is at rest, at block 806, the wake up detector 111 periodically checks the input device 100 for any motion and reports a motion data, if any. At block 808, the control logic 106 triggers the input device 100 to processes only a portion of the image data on the sensor array 103 corresponding to a particular level of rest mode during the wake up detection.

In one embodiment, during the wake up detection, the input device 100 is triggered to process only a substantially small portion of the image data when the input device is under a deep rest mode, and process a larger portion of the image data when the input device 100 is under a light rest mode instead. The control logic 106 may also be configured to dynamically set the wireless input device 100 to process a predetermined portion of the image data on the sensor array 103, during the wake up detection operation when the input device 100 is set to the light rest mode 114 and next process a substantially smaller portion of image data relative to the predetermined portion of the image data when the wireless input device 100 is subsequently set to the deep rest mode 112. At block 810, the control logic 106 may trigger the current controller 108 to provide current limited to a section of the sensor array 103 containing the portion of the image data that is being processed by the input device 100 during the wake up detection operation for enabling power saving when the wireless input device 100 is at rest. As shown in the previous paragraphs, the current controller 108 may include a sensor array biasing block configured to bias current to the sensor array 103 restricted to only a certain section of the sensor array 103 on which the image data are being processed. At block 812, if a motion is detected, the wake up detector 111 switches input device 100 to a normal run mode of operation immediately to enable the navigation operation.

Although the operations of the methods herein are shown and described in a particular order, it will be understood by those skilled in the art, that the order of each method may be altered, for example, so that certain operations may be performed in a different, in an inverse order, or so that certain operations may be performed, at least in part, concurrently with other operations.

Likewise, although specific embodiments of the invention have been described and illustrated herein, the invention is not to be limited to the specific forms or arrangements of parts so described and illustrated. The scope of the invention is to be limited and defined only by the claims appended hereto and their equivalents.

What is claimed is:

1. A wireless input device with a power saving system comprising:
    a sensor having a sensor array configured to capture an image data of a surface;
    a rest mode switch configured to set the input device to various levels of rest modes when the input device is at rest, wherein the various levels of rest modes comprise a light rest mode and a deep rest mode;
    a control logic coupled to the rest mode switch and the sensor, wherein the control logic is configured to set the input device to process a predetermined portion of the image data on the sensor array during a wake up detection operation when the input device is in the light rest mode, and configured to set the input device to process a smaller portion of the image data for monitoring movement on the wireless input device when the input device is in the deep rest mode, wherein the smaller portion of the image data is smaller than the predetermined portion of the image data; and
    a current controller coupled to the control logic and the sensor, the current controller configured to control a current supply limited to a section of the sensor array containing the predetermined portion of the image data that is being processed by the input device during the wake up detection operation.

2. The wireless input device of claim 1, wherein the rest mode switch is configured to set the input device to the various levels of rest modes corresponding to predetermined intervals of time that the wireless input device has been inactive.

3. The wireless input device of claim 2, wherein the wireless input device is set to the light rest mode when the input device has been inactive for an initial interval of time, and wherein the wireless input device is set to the deep rest mode as the input device remains inactive after a subsequent predetermined interval of time.

4. The wireless input device of claim 3, wherein the control logic is configured to set the wireless input device to process half frame of the image data on the sensor array during the wake up detection operation when the input device is set to the light rest mode.

5. The wireless input device of claim 4, wherein the smaller portion of the image data processed in the deep rest mode is substantially smaller relative to the predetermined portion of the image data.

6. The wireless input device of claim 1, wherein the wireless input device further comprises a wake up detector configured to periodically check for motion data when the wireless input device is at rest.

7. The wireless input device of claim 6, wherein the control logic is configured to set the input device to report the motion data upon a detection of motion.

8. The wireless input device of claim 7, wherein the wireless input device is switched to a normal run mode operation upon the detection of motion.

9. The wireless input device of claim 1, wherein the current controller is configured to reduce power consumption during the wake up detection operation when the input device is at rest.

10. The wireless input device of claim 1, wherein the portion of the image data processed in the deep rest mode is a smallest possible portion of the image data for monitoring movement on the wireless input device.

11. A power saving method for use in a wireless input device, the power saving method comprising:
    obtaining an image data in response to a light incident on a sensor array;
    setting the wireless input device to one of various levels of rest modes when the wireless input device is at rest, wherein the various levels of rest modes comprise a light rest mode and a deep rest mode;
    processing a predeteimined portion of the image data on the sensor array during a wake up detection operation when the wireless input device is set to the light rest mode;
    processing a smaller portion of the image data on the sensor array for monitoring movement on the wireless input device when the wireless input device is set to the deep rest mode, wherein the smaller portion of the image data is smaller than the predetermined portion of the image data; and
    providing current limited to a section of the sensor array containing the predetermined portion of the image data that is being processed by the wireless input device during the wake up detection operation.

12. The power saving method of claim 11, further comprising setting the wireless input device to the various levels of rest modes corresponding to predetermined intervals that the input device is at rest.

13. The power saving method of claim 12, further comprising setting the wireless input device to the light rest mode when the wireless input device is at rest at a predetermined initial interval and to the deep rest mode after the wireless input device remains at rest for a predetermined subsequent interval.

14. The power saving method of claim 13, further comprising setting the wireless input device to process half frame of the image data on the sensor array during the wake up detection operation when the input device is set to the light rest mode.

15. The power saving method of claim 13, wherein the smaller portion of the image data processed in the deep rest mode is substantially smaller relative to the predetermined portion of the image data processed in the light rest mode.

16. The power saving method of claim 11, further comprising checking the wireless input device periodically for motion data when the wireless input device is at rest.

17. The power saving method of claim 16, further comprising reporting motion data upon a detection of a motion.

18. The power saving method of claim 11, wherein the portion of the image data processed in the deep rest mode is a smallest possible portion of the image data for monitoring movement on the wireless input device.

19. An input device comprising;
- a light source;
- a sensor having a sensor array configured to capture an image data of a surface;
- a rest mode switch operable to set the input device to various levels of rest modes corresponding to a predetermined interval of time that the input device is at rest; wherein the rest mode switch is configured to set the input device to a light rest mode when the input device is at rest for an initial predetermined interval of time and to a deep rest mode as the input device remains at rest for a subsequent predetermined interval of time;
- a wake up detector configured to periodically check for motion data when the input device is at rest;
- a control logic coupled to the rest mode switch and the sensor, the control logic configured to dynamically set the input device to process a predetermined portion of the image data on the sensor array during the wake up detection operation when the input device is set to the light rest mode and a substantially smaller portion of image data relative to the predetermined portion of the image data when the input device is set to the deep rest mode;
- a current controller coupled to the control logic and the sensor, the current controller configured to control a current supply limited to a section of the sensor array containing the portion of image data that is being processed by the input device during the wake up detection operation; and
- a navigation engine configured to provide a navigation operation.

20. The input device of claim 19, wherein the control logic is configured to set the input device to report motion data upon a detection of a motion, wherein the input device is switched to a normal run mode operation upon the detection of a motion.

* * * * *